(12) United States Patent
McCarthy (10) Patent No.: US 12,065,583 B2
(45) Date of Patent: Aug. 20, 2024

(54) HIGH GLOSS REMOVABLE COATING

(71) Applicant: SWIMC LLC, Cleveland, OH (US)

(72) Inventor: Joseph F. McCarthy, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 714 days.

(21) Appl. No.: 17/285,673

(22) PCT Filed: Oct. 16, 2019

(86) PCT No.: PCT/US2019/056501
§ 371 (c)(1),
(2) Date: Apr. 15, 2021

(87) PCT Pub. No.: WO2020/081661
PCT Pub. Date: Apr. 23, 2020

(65) Prior Publication Data
US 2021/0395537 A1    Dec. 23, 2021

Related U.S. Application Data (60) Provisional application No. 62/746,180, filed on Oct. 16, 2018.

(51) Int. Cl.
*C09D 5/20* (2006.01)
*C09D 7/20* (2018.01)
*C09D 153/00* (2006.01)

(52) U.S. Cl.
CPC ............ *C09D 5/20* (2013.01); *C09D 7/20* (2018.01); *C09D 153/00* (2013.01)

(58) Field of Classification Search
CPC .......... C09D 5/20; C09D 7/20; C09D 153/00; C09D 153/025; C09D 4/00; C09D 4/06; C08K 5/05; C08F 287/00
See application file for complete search history.

(56) References Cited

U.S. PATENT DOCUMENTS

2021/0107044 A1* 4/2021 Suzuki ................ C09D 153/00

FOREIGN PATENT DOCUMENTS

| EP | 2855384 | 4/2015 |
| JP | 4951641 | 6/2012 |

OTHER PUBLICATIONS

Richard et al ("Evaluation of Acrylate-Based Block Copolymers Prepared by Atom Transfer Radical Polymerization as Matrices for Paclitaxel Delivery From Coronary Stents", Biointerface 2005 Symposium). (Year: 2005).*

* cited by examiner

*Primary Examiner* — Robert S Jones, Jr.
*Assistant Examiner* — Jiangtian Xu
(74) *Attorney, Agent, or Firm* — Hahn Loeser & Parks LLP; John J. Cunniff (57) ABSTRACT

A coating composition comprises a base coat component and a top coat component. The base coat component comprises at least one resin selected from the group consisting of a styrene, a styrene-ethylene/butylene-styrene block polymer and a mixture thereof, and at least one solvent for the resin. The top coat component comprises a Methyl-methacrylate-Acrylate-Methyl-methacrylate block polymer and a solvent for the Methyl-methacrylate-Acrylate-Methyl-methacrylate block polymer. A method of temporarily coating a substrate comprises applying the base coat component to a substrate, allowing the base coat component to dry and applying the top coat component and allowing the top coat to dry. The resulting coating can be removed from the substrate by peeling, even after extended exposure to ultraviolet light.

20 Claims, 2 Drawing Sheets

HIGH GLOSS REMOVABLE COATING

CROSS REFERENCE TO RELATED APPLICATIONS

This application is a national stage application of PCT/US2019/056501, filed on Oct. 16, 2019, which claims benefit of U.S. Provisional Application No. 62/746,180 filed on Oct. 16, 2018, the contents of which are incorporated by reference herein.

BACKGROUND OF THE INVENTION

This invention relates to removable coating formulations. More particularly, this invention relates to a gloss removable coating formulation. Even more particularly, this invention relates to clear gloss removable coating formulations that may be combined with specific release agents for use on multiple types of surfaces.

The use of temporary coatings, particularly in connection with automotive finishes, is well known. Temporary coatings may be used, for example, in protecting a finish of an automobile during transport or to add accents or stylization such as so-called "pinstripes," "racing stripes," or other accents or stylization to an automobile. While such markings may be added on a permanent basis, it is sometimes desirable to use a temporary coating, such as one that may be removed by peeling for example. If the marking is temporary, it may be removed as the need or desire for the marking changes, or if an error is made in application of the coating. Alternatively, a clear temporary coating maybe desirable when it is anticipated that hasher than normal conditions may be experienced, such as winter road conditions where sand, salt or the like may be encountered.

The physical properties of elasticity and tensile strength are important in the ability of a film to be removed by peeling from a substrate without tearing. Elasticity dissipates or redistributes uneven peel forces, preventing them from being concentrated at a single point. Tensile strength, the maximum stress a material can withstand before breaking, is needed to withstand the relatively strong forces applied to remove a film by peeling.

Prior removable coatings were often expensive and inconsistent in performance. Some of these coatings would degrade further over time. For these reasons, removable coatings have been a specialized area of coatings and had limited commercial success.

One of these products is a polyurethane dispersion applied over a wax-based release film. While the removability and durability of this system is improved over many other products in this category, it is still high in cost. Being based on waterborne polyurethane dispersion technology, these films are limited, with respect to flexibility (i.e., removability) which is further degraded with exposure to ultraviolet (UV) light and oxidative wear. A coating that is degraded may break easily during removal, creating a large number of small pieces than must be removed individually, greatly reducing the overall economic advantages that the use of such a coating may otherwise provide. As a water based coating, the product must also be applied under ideal conditions of temperature and humidity. Another property effected by its water based composition, are aesthetic properties, such as film clarity, gloss, and distinctness of image (DOI), which are, in most cases, well below that of solvent-based counterparts. (Low DOI is perceived as reduction in sharpness and distinctness on the edges of the reflected image.)

Package stability of polyurethane dispersion products is potentially poor. One particular polyurethane dispersion contains a relatively low amount of water and therefore is classified as a water based composition, but to achieve gloss and package stability, it must also contain significant amounts of solvent, including at least a small amount of relatively strong, slow evaporating solvents such as n-methyl pyrrolidone (NMP) and Glycol Ether EB, which have the potential to be damaging to automotive finishes. In one such example, the polyurethane dispersion contains about 0.5 percent NMP and about 1.7 percent Glycol Ether EB.

Therefore, even with proper application of prior polyurethane dispersion products, which can provide a high gloss, high clarity film, there is still a need for an alternative coating formulation, particularly one which provides improved UV resistance, longer shelf stability, can be applied under a variety of conditions, is more moderate in cost, or any combination of these properties.

Another class of prior products are based on styrene/ethylene-butylene/styrene (A-B-A) tri-block copolymers, which generally are based on synthetic rubber polymers and display improved durability and heat resistance over natural rubber. These polymers have high cohesive strength and elasticity. Certain of these polymers exhibit low adhesion. However, the styrene end groups of these polymers have a tendency to degrade with exposure to sunlight, as would be understood by those of skill in the polymer art. Consequently, many of these formulations recommend removal within 6 months of application.

Some degradation of temporary coatings with exposure to sunlight may take the form of an impaired ability to remove the coating when desired, for example. It is also recognized that temporary coatings are typically offered in a "matte," or low gloss, finish. When a high gloss finish is desired, it frequently requires the separate application of a high gloss transparent top coat. In some examples, the topcoat may be a synthetic rubber-based coating. Such coatings may have an initial gloss reading between 40 and 50, but because of their sensitivity to UV, this gloss reading will decrease noticeably over time.

There is a need therefore, for an alternative temporary coating formulation, that optionally provides resistance to ultraviolet (UV) light. There is also a need for an alternative temporary coating formulation that provides a high gloss finish and may be applied under a variety of conditions and may have greater elasticity for improved removability such as by peeling. There is also a need for an alternative temporary coating that is less expensive than prior coatings and also a need for such coatings that do not rely on strong, slow drying solvents which can be damaging to painted surfaces. There is likewise a need for an alternative temporary coating formulation that has a predicted shelf life of five years or more.

SUMMARY OF INVENTION

It is, therefore, an aspect of the present invention to provide an alternative temporary coating formulation.

It is another aspect of the present invention to provide an alternative temporary coating formulation that is resistant to UV exposure.

It is still another aspect of the present invention to provide an alternative temporary coating formulation that provides a gloss finish.

It is yet another aspect of the present invention to provide an alternative temporary coating formulation that is amenable to application under a variety of conditions.

It is still another aspect of the present invention to provide an alternative temporary coating formulation that has high elasticity, allowing for improved removability such as by peeling.

It is still a further aspect of the present invention to provide an alternative temporary coating formulation that does not utilize strong, slow drying solvents that may harm a painted surface.

It is still another aspect of the present invention to provide an alternative temporary coating formulation that as a predicted shelf life of five years or greater.

In general, the present invention provides a coating composition comprising a base coat and a top coat. The base coat component may comprise at least one resin selected from the group consisting of a styrene, a styrene-ethylene/butylene-styrene block polymer and a mixture thereof, and at least one solvent for the resin. The top coat component comprises a Methyl-methacrylate-Acrylate-Methyl-methacrylate block polymer and a solvent for the Methyl-methacrylate-Acrylate-Methyl-methacrylate block polymer. While not wishing to condition patentability upon theory, it is believed that the base coat provides a clean release from a substrate that the composition is applied to, while the top coat provides elasticity that is largely maintained even after exposure to ultraviolet light such as sunlight.

The claimed coating composition can be removed by physical means such as by peeling from the substrate. When the base coat is applied to a substrate, allowed to dry, and the top coat is applied to the base coat and allowed to dry, the resulting coating can be subsequently removed from the substrate as a single piece across at least 50, 60, 70, 80, 90 or 95 percent or more of the surface of the substrate to which the composition is applied. In one particular example, the resulting coating can be subsequently removed from the substrate as a single piece across at least 99 percent of the surface of the substrate.

In addition or in the alternative, the ability of the coating to be peeled from the substrate is not significantly impaired from exposure to ultraviolet (UV) light, such as sunlight. Previous coatings degraded significantly in their ability to be peeled after exposure to sunlight. Prior removable coatings typically degraded after 3 months of exposure to sunlight, such that manufacturers of these as commercial products recommended their removal within 3 months. The claimed coating composition is still removable by peeling after 3, 6, 9, 12, 18 or even 24 months.

The base coat of the coating composition may comprise a solvent for the base coat resin such as parachlorobenzotrifluoride (PCBTF), Varnish Maker's and Painter's (VM&P) Naphtha, dimethyl carbonate (DMC) and mixtures and combinations thereof. A metallic salt such as sodium stearate, calcium stearate, zinc stearate, and/or lithium stearate may be present. An antioxidant such as butylated hydroxytoluene may also be present. The base coat may be applied as an aerosol by charging the base coat with a propellant such as propane, optionally with dimethyl ether, for example.

The top coat of the coating composition generally comprises an acrylic A-B-A triblock polymer. In one example, the polymer is a Methyl-methacrylate-Acrylate-Methyl-methacrylate (MAM) block polymer. MAM block polymer consists of methyl methacrylate hard-blocks (PMMA-blocks) and an acrylic based soft-block. While not wishing to condition patentability on theory, it is believed that the hard exterior blocks provide hardness and gloss, while the very soft (−90° F. Tg) midblocks provide very high levels of flexibility. In one particular example, the polymer is based on a poly(n-butyl acrylate) (PnBA) midblock.

At least one solvent for the polymer resin may also be present in the top coat. In some examples, the solvent is one or more solvents selected from the group consisting of benzyl alcohol, ethyl 3-ethoxyproprionate, dimethoxyethane, methanol, and dimethyl carbonate. Other additives such as defoamers and wetting agents may also be present. In one example, the additives may include Polyether-modified polydimethylsiloxane as a wetting agent and/or BYK®-051 (BYK-Chemie GmbH, Wesel, Germany) may be present. A pigment may also be present in the topcoat to provide a coloration to the coating.

In addition or in the alternative, the coating provides a gloss finish and/or is removable without scraping after 1000 hours of QUV testing or more. In one particular example, the coating provides a gloss finish and/or is removable without scraping after 1500 hours of QUV testing. The present invention also provides a method of temporarily coating a substrate, the method comprising applying the base coat and top coat compositions to a substrate, where the coating provides a gloss finish and/or is removable without scraping after exposure to UV light.

Further in addition or in the alternative, the coating is removable without scraping after exposure to sunlight for 3 months, 6 months, 9 months, 12 months, 18 months or even 2 years or more.

The present invention also provides a method of temporarily coating a substrate. The method comprises coating a substrate with a base coat, allowing the base coat to dry to provide a dry base coat on the substrate, coating the dry base coat with a top coat and allowing the top coat to dry. The resulting coating can be subsequently removed from the substrate as a single piece across at least 50, 60, 70, 80, 90 or 95 percent or more of the surface of the substrate to which the composition is applied. In one particular example, the resulting coating can be subsequently removed from the substrate as a single piece across at least 99 percent of the surface of the substrate.

As provided above, the base coat of the coating composition may comprise a solvent for the base coat resin such as parachlorobenzotrifluoride (PCBTF), Varnish Maker's and Painter's (VM&P) Naptha, dimethyl carbonate (DMC) and mixtures and combinations thereof. A metallic salt such as sodium stearate, calcium stearate, zinc stearate, and/or lithium stearate may be present. An antioxidant such as butylated hydroxytoluene may also be present. The base coat may be applied as an aerosol by charging the base coat with a propellant such as propane, optionally with dimethyl ether, for example.

The top coat of the coating composition generally comprises an acrylic A-B-A triblock polymer. In one example, the polymer is a Methyl-methacrylate-Acrylate-Methyl-methacrylate (MAM) block polymer. MAM block polymer consists of methyl methacrylate hard-blocks (PMMA-blocks) and an acrylic based soft-block. In one particular example, the polymer is based on a poly(n-butyl acrylate) (PnBA) midblock.

At least one solvent for the polymer resin may also be present in the top coat. In some examples, the solvent is one or more solvents selected from the group consisting of benzyl alcohol, ethyl 3-ethoxyproprionate, dimethoxyethane, methanol, and dimethyl carbonate. Other additives such as defoamers and wetting agents may also be present. In one example, the additives may include Polyether-modified polydimethylsiloxane as a wetting agent and/or BYK®-051 (BYK-Chemie GmbH, Wesel, Germany) may be present. A pigment may also be present in the topcoat to provide a coloration to the coating.

DETAILED DESCRIPTION OF THE INVENTION

The present invention is directed toward an alternative temporary coating formulation. The formulation may provide UV resistance. In addition or in the alternative, the coating may provide a gloss finish when dry. The coating may also provide impact resistance, thereby providing additional protection to a surface beyond any other permanent coatings that may also be present.

In general, the present invention provides a coating composition comprising a base coat and a top coat. The base coat and the top coat each contain at least one resin providing a coating with an elasticity value between 380 percent and 500 percent and a tensile strength between approximately 400 and 1400 pounds/square inch (lbs./sq inch). The resin or resins used in the base coat may be different from the resin or resins used in the top coat.

The base coat may comprise a resin selected from styrene, styrenic copolymers, or mixtures including styrene. In one example, the resin is selected from a styrene, a styrene-ethylene/butylene-styrene block polymer and mixtures thereof. In one particular example the resin may be selected from one or more of Kraton® G 1652 (Kraton Polymers US LLC, Houston, Texas), Piccolastic® A75 (Eastman Chemical Co., Kingsport Tennessee) and mixtures thereof. Kraton® G 1652 is a styrene-ethylene-butylene styrene (SEBS) linear block copolymer with a polystyrene content of about 30 percent. It provides a reported elongation value of 500% and a tensile strength of 31 MPa as determined according to ASTM D412, which converts to 1396 lbs./sq inch. Piccolastic A75 is a styrene monomer with a weight average molecular weight ($M_w$) of 1300, a number average molecular weight ($M_n$) of 700, and Man, ratio of 1.9. In one example, the resin in the base coat comprises between 5 and 10 weight percent SEBS copolymer and between 1 and 1.5 weight percent styrene. In another example, the base coat resin comprises less than 1 weight percent SEBS copolymer and less than 1 weight percent styrene. Such a formulation may be suitable for aerosol application. In addition or in the alternative, in some examples, the basecoat resin comprises between 0.4 weight percent and 1.5 weight percent styrene and between 0.4 weight percent and 8.5 weight percent SEBS copolymer. In some examples, particularly those intended for aerosol application, base coat comprises less than 1 weight percent total resin. In other examples, the total resin content of the base coat formulation is between 6.7 and 9.5 weight percent. Further in addition or in the alternative, the resin may be selected from one or more of Kraton® G 1652 (Kraton Polymers US LLC, Houston, Texas) SEBS polymer, and Piccolastic® A75 (Eastman Chemical Co., Kingsport Tennessee) styrene. In still further examples, the basecoat may also comprise a Methyl-methacrylate-Acrylate-Methyl-methacrylate (MAM) block polymer as described below for the top coat.

The base coat may include a solvent such as parachlorobenzotrifluoride (PCBTF), Varnish Maker's and Painter's (VM&P) Naptha, dimethyl carbonate (DMC) and mixtures and combinations thereof. In certain examples, the base coat may comprise between 23 weight percent and 87 weight percent solvent. In some examples, such as those intended for aerosol application, the solvent content of the base coat may be 23 weight percent or more. In one particular example, the base coat comprises 2.31 weight percent VM&P Naptha and 20.77 weight percent DMC, exclusive of solvent used in connection with the propellant. In other examples, the base coat may comprise 71.4 weight percent VM&P Naptha and 9 weight percent DMC. In still another example, the solvent comprises 86.5 weight percent PCBTF.

A metallic salt such as sodium stearate, calcium stearate, and/or lithium stearate may be present. An antioxidant such as butylated hydroxytoluene may also be present. The base coat may be applied as an aerosol by charging the base coat with a propellant such as propane for example.

The top coat may include a Methyl-methacrylate-Acrylate-Methyl-methacrylate (MAM) block polymer. In some examples, the polymer may be KURARITY™ LA 2250 (Kuraray Co., Ltd., Tokyo, Japan), which provides a reported elasticity of 380 percent and a tensile strength of 9.0 mPA according to method ISO 37, which converts to 405 lbs./sq inch. In further examples, the polymer may be KURARITY™ LA 4285 or KURARITY™ LA 3320 (Kuraray Co., Ltd., Tokyo, Japan). In some examples, the MAM block polymer may be present at a concentration of 15 to 36 weight percent. In other examples, particularly those adapted for use for aerosol application, the MAM block polymer may be present at a concentration of 10 to 35.1 weight percent of the topcoat composition. In still other examples, the MAM block polymer may be present at a concentration of 10 to 15 weight percent of the topcoat composition.

The top coat may comprise one or more solvents for the resin such as MAM block polymer. These include aromatic solvents, carbonate solvents, ester solvents, ketone solvents, glycol ether solvents, glycol ether acetate solvents, halogenated solvents, terpene solvents, ether solvents, biobased solvents and other miscellaneous solvents. Aromatic solvents that may be used as a solvent for the MAM block polymer include benzene, toluene, xylene, ethyl benzene, and naphtha. Carbonate solvents that may be used include propylene carbonate, ethylene carbonate, dimethyl carbonate, ethyl methylcarbonate and diethyl carbonate. Ester solvents may also be used as solvents for the MAM block polymer. These include methyl acetate, n-butyl acetate, ethyl acetate, n-propyl acetate, amyl acetate, ethyl ethoxy proprionate, ethyl hexyl acetate, triacetin, isobutyl isobutyrate and dibasic ester. Suitable ketone solvents include acetone, methyl ethyl ketone (MEK), methyl propyl ketone (MPK), methyl isobutyl ketone (MIBK), methyl isoamyl ketone (MIAK), cyclohexanone, methyl amyl ketone (MAK), diisobutyl ketone (DIBK), C-11 ketone, and acetophenone.

Glycol ether solvents that may be used as a solvent for the MAM block polymer include Propylene Glycol Monomethyl Ether, Propylene Glycol t-Butyl Ether, Ethylene Glycol Monoethyl Ether, Propylene Glycol n-Propyl Ether, Propylene Glycol Monomethyl Ether, Propylene Glycol Monoethyl Ether, Ethylene Glycol Monobutyl Ether, Dipropylene Glycol Monomethyl Ether, Dipropylene Glycol n-Butyl Ether, Ethylene Glycol n-Hexyl Ether, and Tripropylene Glycol Methyl Ether. Glycol Ether Acetate solvents that are suitable include Propylene Glycol Monomethyl Ether Acetate, Ethylene Glycol Monoethyl Ether Acetate, Propylene Glycol n-Butyl Ether Acetate, Ethylene Glycol Diacetate, Dipropylene Glycol Monomethyl Ether Acetate, Dipropylene Glycol Monoethyl Ether Acetate and Dipropylene Glycol MonoButyl Ether Acetate. Halogenated solvents such as chloroform or paratrifluorobenzene may also be used. The terpene solvent D-limonene is also suitable as a solvent for the MAM block polymer, as are the ether solvent dimethyl ether and the biobased solvent methyl soyate. Other suitable miscellaneous solvents not falling into the above categories include benzyl alcohol, diacetone alcohol, texanol, n-methyl pyrrolidone and tetrahydrofuran.

In certain examples, the solvent may be chosen from the group consisting of parachlorobenzotrifluoride (PCBTF), benzyl alcohol, propylene carbonate, dimethyl carbonate (DMC), ethyl 3-ethoxyproprionate (EEP) and mixtures and combinations thereof. In some examples, the solvent may be a mixture of benzyl alcohol, dimethyl carbonate (DMC), and ethyl 3-ethoxyproprionate (EEP). In other examples, the solvent may be a mixture of PCBTF, benzyl alcohol and propylene carbonate. In some examples, the top coat comprises between 0.8 and 4 weight percent benzyl alcohol. In addition or in the alternative, the top coat may comprise between 7 and 25 weight percent EEP. In certain of these examples, particularly those intended to be delivered by aerosol spray, the top coat may comprise between 7 and 8 percent by weight EEP. In other examples, the top coat may comprise between 23 and 25 weight percent EEP. In further addition or alternative, the top coat may comprise between 10 and 35.1 weight percent DMC. In some particular examples, including those intended to be delivered by aerosol spray, DMC may be present in the top coat at a concentration of 10 to 11 percent by weight. In other examples, DMC may be present in the top coat at a concentration of 33 to 35.1 percent by weight.

In some particular examples, the top coat may comprise a solvent mixture that comprises 3.7 to 4.0 weight percent benzyl alcohol, 23 to 25 weight percent EEP and 33 to 35.1 weight percent DMC. In other examples, particularly those intended to be delivered by aerosol spray, the top coat may comprise a solvent mixture that comprises 1.1 to 1.3 weight percent benzyl alcohol, 7.2 to 7.7 weight percent EEP and 10.3 to 10.9 weight percent DMC.

The use of components such as defoaming agents, like BYK-052 N (Byk-Chemie GmbH, Wessel, Germany), and leveling agents, like BYK 307 (Byk-Chemie GmbH, Wessel, Germany), an alkyl ether polydimethylsiloxane, for example, may be used here to assist in the manufacture of the coating composition without harming the properties of the final product. In some examples, these components may be present at a concentration of less than 1 percent by weight of the topcoat composition. In other examples, these components may be present at a concentration 0.25 percent by weight or less of the topcoat composition.

Pigments may also be used as they commonly are in the coatings industry, at a level appropriate for the desired color of the final product. Example include carbon black, titanium dioxide, JHR1703L, Pigment Red 170 (Napthol Red), (Shanghai JECO Group Ltd., Shanghai, China), 2300, Pigment White 6 (TiO2, Kronos Worldwide, Dallas, Texas, USA), Heliogen L 6700 F, Pigment Blue 15:6 (Phthalocyanine Blue, BASF Ludwigshafen, Germany), Raven 850, Pigment Black 7, (Aditya Birla, Worli, Mumbai, India), Lysopac 6616B, Pigment Yellow 184, (Cappelle Pigments, Menen, Belgium) Pantint 12G1740P, Pigment Green 36 (chip dispersion, PAN Technologies, Carlstadt, NJ), BF Micro, BF Micro Plus, and similar pigments.

Additional components may optionally be present such as UV absorbers and antioxidants, such as butylated hydroxytoluene (BHT), to provide their associated properties to the final composition. In those applications in which the top coat composition is intended to be applied as an aerosol spray, the top coat composition may be charged with a propellant such as dimethoxyethane. Optionally, solvents such as acetone and/or methanol may also be present.

The present invention may be provided as a two-part kit. Such a kit may include the base coat and top coat compositions in separate containers. For example, the base coat and top coat could be provided in formulations that permit both to be manually applied, as by brushing for example, for both to be applied as an aerosol spray, or for one to be manually applied and the other to be applied as an aerosol spray. In one particular example, the base coat could be provided impregnated into a towelette or similar cloth or fabric, which could in turn be packaged with an aerosol spray can of the top coat formulation. Optionally, the base coat-impregnated towelette could be packaged under the cap of the aerosol can to optimize convenience for the manufacturer, retailer or consumer.

The invention will be better understood by reference to the following examples which are included for the purpose of illustration and not limitation. One example of the base coat composition was made with the components listed in Table 1.

TABLE 1

| (CWO-499a) | |
| --- | --- |
| Component | Weight % |
| VM&P Naptha | 71.40% |
| Lithium Stearate | 9.50% |
| Butylated Hydroxytoluene | 0.60% |
| Dimethyl carbonate | 9.00% |
| PICCOLASTIC ® A75 | 1.30% |
| KRATON ® G 1652 | 8.20% |

A similar composition was made by combining the first 5 components listed in Table 2, and the resulting composition was then charged with propane and additional dimethyl carbonate, provided as the last two components in Table 2, to provide an aerosol base coating for a temporary coating formulation.

TABLE 2

| (CWO-499b) | |
| --- | --- |
| Component | Weight % |
| VM&P Naptha | 2.31% |
| Lithium Stearate | 14.42% |
| Butylated Hydroxytoluene | 21.55% |
| Dimethyl carbonate | 20.77% |
| PICCOLASTIC ® A75 | 0.48% |
| KRATON ® G 1652 | 0.48% |

TABLE 2-continued (CWO-499b)

| Component | Weight % |
|---|---|
| Dimethyl carbonate | 15.00% |
| Propane | 25.00 |

In another example, a base coat formulation was synthesized with the following components listed below in Table 3.

TABLE 3

(CWO 502)

| Component | Weight % |
|---|---|
| Parachlorobenzotriflouride | 86.52% |
| Lithium Stearate | 6.50% |
| Butylated Hydroxytoluene | 0.25% |
| PICCOLASTIC ® A75 | 1.00% |
| KRATON ® G 1652 | 5.73% |

The resulting composition was suitable for manual application to a substrate surface.

A clear high gloss top coat was formulated as follows in Table 4.

TABLE 4

(CWO 500)

| Component | Weight % |
|---|---|
| Parachlorobenzotriflouride | 83.45% |
| Benzyl alcohol | 0.81% |
| Propylene carbonate | 0.50% |
| KURARITY ™ LA 2250 | 15.00% |
| BYK ® 302 | 0.12% |
| BYK ® 051 | 0.12% |

Another clear high gloss top coat was formulated as in Table 5.

TABLE 5

(CWO-493a)

| Component | Weight % |
|---|---|
| Benzyl alcohol | 3.9% |
| Ethyl 3-ethoxyproprionate | 24.35% |
| Dimethyl carbonate | 35.06% |
| KURARITYT™ LA 2250 | 35.06% |
| BYK ® 302 | 0.81% |
| BYK ® 051 | 0.81% |

A similar formulation was made as in Table 6 for use as a clear high gloss aerosol formulation.

TABLE 6

(CWO-493)

| Component | Weight % |
|---|---|
| Benzyl alcohol | 1.21% |
| Ethyl 3-ethoxyproprionate | 7.55% |
| Dimethyl carbonate | 10.87% |
| KURARITY ™ LA 2250 | 10.87% |
| BYK ® 302 | 0.25% |
| BYK ® 051 | 0.25% |

TABLE 6-continued (CWO-493)

| Component | Weight % |
|---|---|
| Methanol | 3.20% |
| Acetone | 18.80% |
| dimethoxyethane | 47.00% |

A high gloss red topcoat was formulated as in Table 7.

TABLE 7

(CWO-494)

| Component | Weight % |
|---|---|
| Benzyl alcohol | 3.84% |
| Ethyl 3-ethoxyproprionate | 24.00% |
| Dimethyl carbonate | 34.56% |
| KURARITY ™ LA 2250 | 34.56% |
| BYK ® 302 | 0.80% |
| BYK ® 051 | 0.80% |
| JHR1703L | 1.44% |

A high gloss red aerosol topcoat was formulated as in Table 7.

TABLE 7

(CWO-494b)

| Component | Weight % |
|---|---|
| Benzyl alcohol | 1.19% |
| Ethyl 3-ethoxyproprionate | 7.44% |
| Dimethyl carbonate | 10.71% |
| KURARITY ™ LA 2250 | 10.71% |
| BYK ® 302 | 0.25% |
| BYK ® 051 | 0.25% |
| JHR1703L | 0.45% |
| Methanol | 3.20% |
| Acetone | 18.80% |
| dimethoxyethane | 47.00% |

A high gloss white topcoat was formulated as in Table 8.

TABLE 8

(CWO-495a)

| Component | Weight % |
|---|---|
| Benzyl alcohol | 3.73% |
| Ethyl 3-ethoxyproprionate | 23.29% |
| Dimethyl carbonate | 33.23% |
| KURARITY ™ LA 2250 | 33.54% |
| BYK ® 302 | 0.78% |
| BYK ® 051 | 0.78% |
| 2300 Titanium dioxide | 3.11% |
| BF Micro | 1.55% |

A high gloss white aerosol topcoat was formulated as in Table 9.

TABLE 9

(CWO-495b)

| Component | Weight % |
|---|---|
| Benzyl alcohol | 1.16% |
| Ethyl 3-ethoxyproprionate | 7.22% |
| Dimethyl carbonate | 10.30% |
| KURARITY ™ LA 2250 | 10.40% |

TABLE 9-continued (CWO-495b)

| Component | Weight % |
|---|---|
| BYK ® 302 | 0.24% |
| BYK ® 051 | 0.24% |
| JHR1703L | 0.96% |
| BF Micro Plus | 0.48 |
| Methanol | 3.20% |
| Acetone | 18.80% |
| dimethoxyethane | 47.00% |

A high gloss blue topcoat was formulated as in Table 10.

TABLE 10

(CWO-496a)

| Component | Weight % |
|---|---|
| Benzyl alcohol | 3.96% |
| Ethyl 3-ethoxyproprionate | 24.78% |
| Dimethyl carbonate | 33.43% |
| KURARITY ™ LA 2250 | 35.68% |
| BYK ® 302 | 0.83% |
| BYK ® 051 | 0.83% |
| Heliogen L 6700 F | 0.27% |
| 2300 TiO2 | 0.23% |

A high gloss blue aerosol topcoat was formulated as in Table 11.

TABLE 11

(CWO-496b)

| Component | Weight % |
|---|---|
| Benzyl alcohol | 1.23% |
| Ethyl 3-ethoxyproprionate | 7.68% |
| Dimethyl carbonate | 10.36% |
| KURARITY ™ LA 2250 | 11.06% |
| BYK ® 302 | 0.26% |
| BYK ® 051 | 0.26% |
| JHR1703L | 0.08% |
| BF Micro Plus | 0.07% |
| Methanol | 3.20% |
| Acetone | 18.80% |
| dimethoxyethane | 47.00% |

A high gloss black topcoat was formulated as in Table 12.

TABLE 12

(CWO-497a)

| Component | Weight % |
|---|---|
| Benzyl alcohol | 3.87% |
| Ethyl 3-ethoxyproprionate | 24.19% |
| Dimethyl carbonate | 34.84% |
| KURARITY ™ LA 2250 | 34.84% |
| BYK ® 302 | 0.81% |
| BYK ® 051 | 0.81% |
| Raven 850 (PBk 7) | 0.65% |

A high gloss black aerosol topcoat was formulated as in Table 13.

TABLE 13

(CWO-497b)

| Component | Weight % |
|---|---|
| Benzyl alcohol | 1.20% |
| Ethyl 3-ethoxyproprionate | 7.50% |
| Dimethyl carbonate | 10.80% |
| KURARITY ™ LA 2250 | 10.80% |
| BYK ® 302 | 0.25% |
| BYK ® 051 | 0.25% |
| Raven 850 (PBk 7) | 0.20% |
| Methanol | 3.20% |
| Acetone | 18.80% |
| dimethoxyethane | 47.00% |

In another example, a lime gloss temporary coating formulation was synthesized with the components listed in Table 14.

TABLE 14

(CWO-498a)

| Component | Weight % |
|---|---|
| Benzyl alcohol | 3.77% |
| Ethyl 3-ethoxyproprionate | 23.58% |
| Dimethyl carbonate | 35.24% |
| KURARITY ™ LA 2250 | 33.96% |
| BYK ® 302 | 0.79% |
| BYK ® 051 | 0.79% |
| Lysopac Yellow 6616B | 1.73% |
| Pantint 12 Green | 0.15% |

A high gloss lime aerosol topcoat was formulated by combining the first eight components listed in Table 15. The resulting concentrate was then combined with the last 3 components in Table 15 to provide the aerosol composition.

TABLE 15

(CWO-498b)

| Component | Weight % |
|---|---|
| Benzyl alcohol | 1.16% |
| Ethyl 3-ethoxyproprionate | 7.27% |
| Dimethyl carbonate | 10.87% |
| KURARITY ™ LA 2250 | 10.47% |
| BYK ® 302 | 0.24% |
| BYK ® 051 | 0.24% |
| Lysopac Yellow 6616B | 0.53% |
| Pantint 12 Green | 0.21% |
| Methanol | 3.20% |
| Acetone | 18.80% |
| Dimethoxyethane | 47.00% |

The inventive coatings were applied to both smooth original equipment manufacturer (OEM) substrates and/or cold rolled steel panels (such as R-36 and R-412 panels from Q-Panel Corp., Westlake, Ohio) and the initial gloss of each coating was determined. The samples were then exposed to simulated weathering conditions. The gloss and general condition of the coating was examined and determined to be acceptable. The coating was capable of being removed by physical removal (peeling) alone and did not require treatment with another compound or mixture. It should be noted that the rougher cold-rolled steel panels provided a substrate from which it would be more difficult to peel a temporary coating from, compared to the relatively smooth OEM panels.

The inventive base coat/top coat coatings system, in black, white, and red and a competitive single coat (SEBS)

product, also in black, white, and red, were applied to A-39 (Q-PanelCorp.), non-coated/non-treated aluminum panels as follows. The panels tested for gloss measuring reflectance of light at 60°, per ASTM D 4587. The panels were placed in a QUV cabinet, for 1500 hours, during which they were alternately illuminated, under UVA-340 lamps, to approximate degradation due to sunlight, and exposed to condensation, to simulate dew and rain. UVA-340 lamps are the preferred UV light source for their approximation of natural sunlight compared to UVB-313 lamps.

Irradiance: 0.77 W/m2/nm
UV cycle: 4 hours at 60° C.+/−3° C.
Condensation cycle: 4 hours at 50° C.+/−3° C.

At the conclusion of 1500 hours of QUV testing, films were tested for visual appearance, gloss at 60°, and the ability to be peeled. The results are provided in following tables.

The black coating of the present invention had the following composition.

TABLE 16

(CWO-333 Black)

| Component | Weight % |
|---|---|
| Benzyl alcohol | 1.47% |
| Ethyl 3-ethoxyproprionate | 8.84% |
| Dimethyl carbonate | 12.68% |
| KURARITY ™ LA 2250 | 12.38% |
| BYK ® 300 | 0.35% |
| BYK ® 052 | 0.18% |
| 30C965 Black 28 | 0.71% |
| Dimethyl ether (DME) | 38.32% |

The high gloss white coating formulation was formulated as in Table 17.

TABLE 17

(CWO-228 White)

| Component | Weight % |
|---|---|
| Benzyl alcohol | 1.46% |
| Ethyl 3-ethoxyproprionate | 8.75% |
| Dimethyl carbonate | 12.53% |
| KURARITY ™ LA 2250 | 12.24% |
| BYK ® 300 | 0.50% |
| BYK ® 052 | 0.25% |
| 2300 TiO2 | 1.05% |

TABLE 17-continued (CWO-228 White)

| Component | Weight % |
|---|---|
| BF Micro Plus | 0.55% |
| Methanol | 24.78% |

The high gloss red aerosol topcoat was formulated as in Table 18.

TABLE 18

(CWO-334 Red)

| Component | Weight % |
|---|---|
| Benzyl alcohol | 1.47% |
| Ethyl 3-ethoxyproprionate | 8.85% |
| Dimethyl carbonate | 12.68% |
| KURARITY ™ LA 2250 | 12.39% |
| BYK ® 300 | 0.35% |
| BYK ® 052 | 0.18% |
| JHR 1703L | 0.44% |
| Methanol | 25.07% |
| BF Micro Plus | 0.22% |
| Dimethyl ether | 38.34% |

A base coat concentrate was made as provided in Table 19.

TABLE 19

(CWO-339)

| Component | Weight % |
|---|---|
| Mineral Spirits | 33.32% |
| Oxsol | 25.88% |
| Xylene | 12.94% |
| KRATON ® MD1653 | 12.94% |
| PICCOLASTIC ® A75 | 2.26% |
| Butylated Hydroxytoluene (BHT) | 0.40% |
| Cyclohexane | 20.16% |
| Propylene Glycol n-Butyl Ether | 1.96% |

To 100 parts of this concentrate, 15 part of lithium stearate and 115 parts of VM&P Naphtha was added to create a final base coat composition. This base coat and top coat combinations were used to coat the aluminum test panels. The initial gloss and final gloss after QUV testing, with other testing parameters are provided in Table 20 below.

TABLE 20

| Test Sample | Base Coat | Top Coat | QUV Hrs. | Film Thickness (mil) | Gloss- Initial | Gloss- Final | Peel Rating* | Notes |
|---|---|---|---|---|---|---|---|---|
| 5c-1500 | n/a (single stage) | SEBS Black Control | 1500 | 2.00 (50.8 μm) | 4.9 | 2.0 | 10.0 | Fail |
| 5a-1500 | n/a (single stage) | SEBS White Control | 1500 | 2.30 (58.4 μm) | 6.0 | 2.0 | 10.0 | Fail (and yellowed) |
| 5d-1500 | n/a (single stage) | SEBS Red Control | 1500 | 1.92 (48.8 μm) | 4.0 | 2.0 | 10.0 | Fail |
| 4c-1500 | CWO-339 (See Table 19) | CWO-333 Black (See Table 16) | 1500 | 5.69 (144.5 μm) | 83.5 | 73.0 | 6.0 | Very good |
| 4a-1500 | CWO-339 (See Table 19) | CWO-328 White (See Table 17) | 1500 | 4.55 (115.6 μm) | 85.7 | 73.0 | 5.0 | Ideal |

TABLE 20-continued

| Test Sample | Base Coat | Top Coat | QUV Hrs. | Film Thickness (mil) | Gloss-Initial | Gloss-Final | Peel Rating* | Notes |
|---|---|---|---|---|---|---|---|---|
| 4a-1500 | CWO-339 (See Table 19) | CWO-334 Red (See Table 18) | 1500 | 3.55 (90.2 μm) | 71.0 | 57.0 | 5.0 | Ideal |

Explanation of Peel Rating

| Peel Rating | Description |
|---|---|
| 0 | Fail-severe loss of adhesion with no peel force |
| 1 | Fail-moderate loss of adhesion with no peel force |
| 2 | Fail-some loss of adhesion with no peel force |
| 3 | Pass-peels with minimal force |
| 4 | Pass-moderate peel force required |
| 5 | Ideal balance of adhesion and peelability |
| 6 | Pass-peelable-positive peel force required |
| 7 | Pass-peels with high force |
| 8 | Fail-some areas fail to peel |
| 9 | Fail-most areas fail to peel |
| 10 | Fail-unpeelable |

Films of the inventive base coat/top coat coatings system (4c-1500, 4a-1500 and 4d-1500), after 1500 hours QUV exposure, were rated as "ideal", or "pass". Films based on the SEBS, single stage control (5c-1500, 5a-1500 and 5d-1500), after 1500 hours QUV exposure, all showed no peelability.

Additional testing indicates that while coatings based on SEBS polymer exhibit a failure to peel from a surface with 3 months of outdoor exposure, the coatings of the present invention display a continued ability to peel from a surface after 1 year of outdoor exposure.

Long term resistance to weathering and UV exposure was tested by exposing 3 inch (7.6 centimeters) by 9 inch (22.9 centimeters) aluminum panels, coated with examples of the coating composition, to an outdoor environment for 70 days. The base coat component had the composition provided in Table 19 and the topcoat component had the composition provided in Table 17. The base coat was applied, allowed to dry and the top coat was then applied and allowed to dry. The panels were placed outdoors and exposed to the elements at a 41 degree north angle in Warrensville Heights, Ohio.

Figure 1:
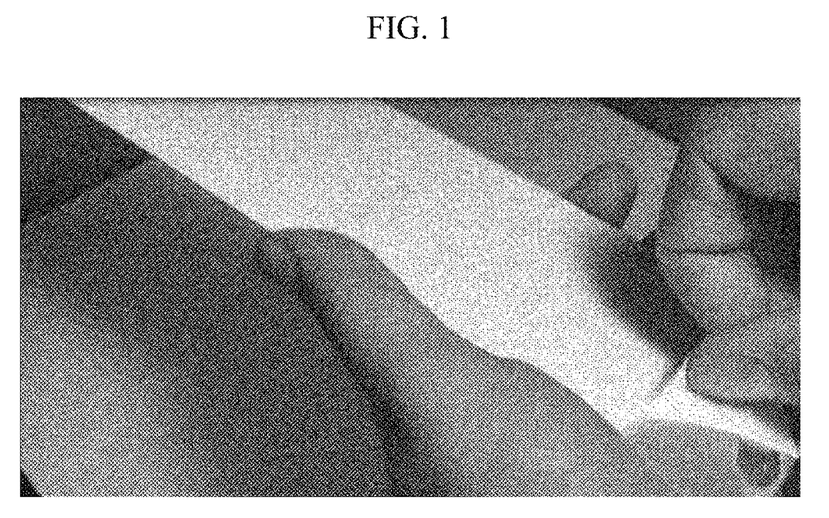
FIG. 1 is a photograph of an example of peel testing of a coating after exposure to environmental conditions at a first, early stage of removal.
Figure 2:
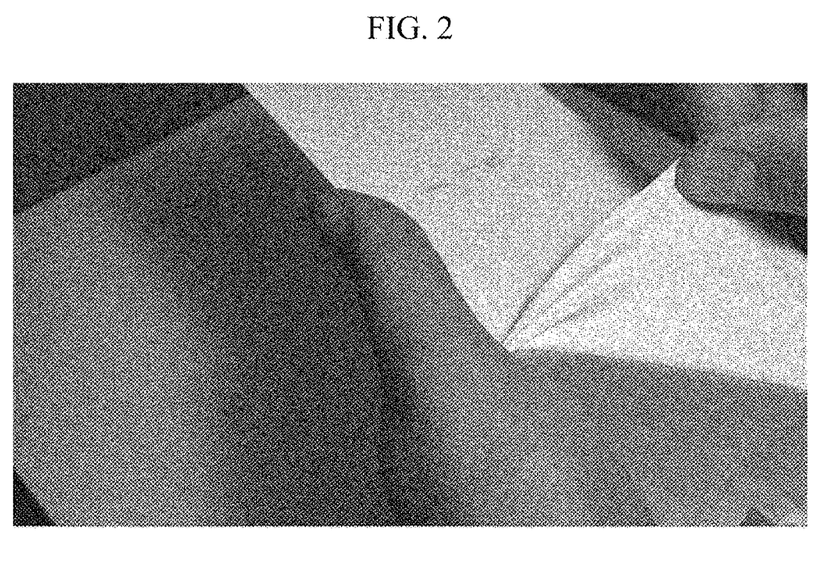
FIG. 2 is a photograph of the example of peel testing of a coating after exposure to environmental conditions, shown in FIG. 1, at a second, later stage of removal.
Figure 3:
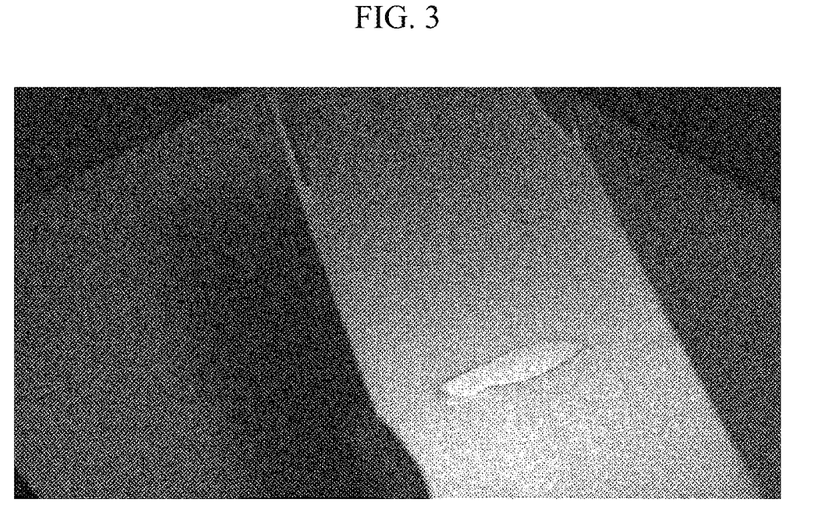
FIG. 3 is a photograph of the result of peel testing of an example of a coating after exposure to environmental condition, shown in FIGS. 1 and 2, showing the substrate after complete removal of the coating from the surface of the substrate.
Figure 4:
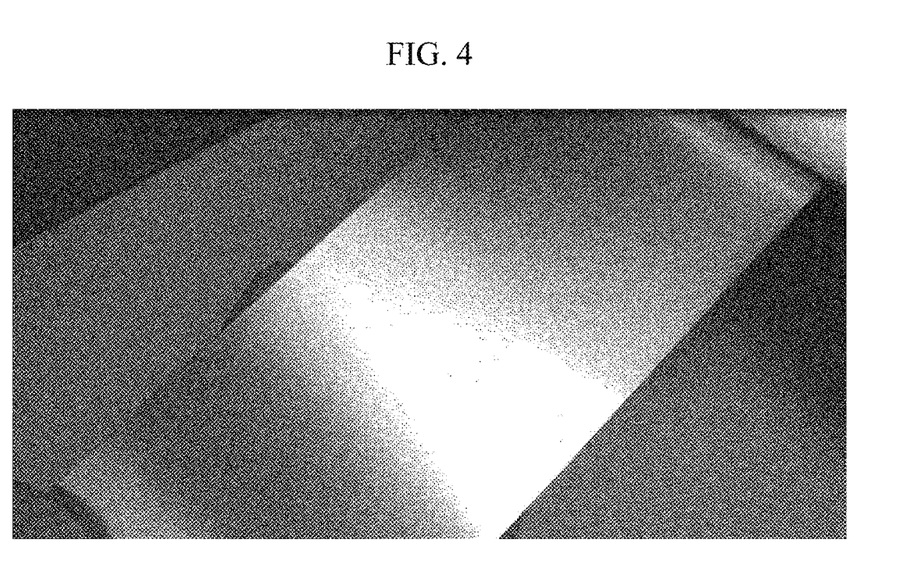
FIG. 4 is a photograph of the substrate shown in FIGS. 1-3, after further cleaning of remaining residue by wiping to provide a clean, uncoated surface.

FIGS. 1-4 are photographs of peel testing of the coating after exposure to environmental conditions. FIG. 1 shows peel testing at a first, early stage and FIG. 2 shows peel testing at a second later stage. FIG. 3 shows the substrate after the coating is completely removed from the substrate. After the coating was completely removed, only a residue was left on the substrate panel, which was easily removed by wiping. The resulting cleaned panel is shown in FIG. 4. The coating composition is removed by physical peeling as a single piece from at least 95 percent of the surface of the substrate. The substrate has a surface area of approximately 27 square inches (174 square centimeters). Therefore, the coating was removed from the substrate in a single piece of at least 25.7 square inches (165.3 square centimeters). As one of skill in the art will recognize from FIGS. 1-4, the amount of coating composition removed cleanly from the substrate is limited predominantly by the size and dimensions of the substrate test panel.

A further example of the claimed invention was similarly coated onto 3 inch by 9 inch (7.6 cm by 22.9 cm) aluminum test panels. The base coat formulation is provided in Table 21 and the top coat formulation is provided in Table 22 below.

TABLE 21

(CWO 255)

| Component | Weight % |
|---|---|
| KURARITY ™ LA 2250 | 4.80% |
| Benzyl alcohol | 1.6% |
| Lithium Stearate | 1.6% |
| Dimethyl carbonate | 72.01% |
| Propane | 20% |

TABLE 22

(CWO-261a)

| Component | Weight % |
|---|---|
| Titanium dioxide | 1.74% |
| BYK ® 052N Ethyl 3-ethoxyproprionate | 0.06% |
| Benzyl alcohol | 7.52% |
| Dimethyl carbonate | 31.38% |
| KURARITY ™ LA 2250 | 13.95% |
| BYK ® 307 | 0.03% |
| Dimethoxyethane | 45.32% |

The coating composition was applied to the substrate test panels as described above and exposed to outdoor conditions at a 41 degree north angle in Warrensville Heights, Ohio for 356 days. After this outdoor exposure, the coating composition still exhibited high gloss and DOI (data not shown). The coating was removed as above, but the coating composition separated after approximately 50 percent of the coating composition was removed (not shown). The remainder was removed by peeling in predominantly one piece.

It should also be noted that the claimed coating compositions were tolerant of a wide variety of application conditions. While SEBS-based coatings typically caution against application in hot or cold conditions, particularly in hot, humid conditions and/or in direct sunlight, the present coating may be applied under such conditions with no significant decrease in performance. It is also projected that the present coating compositions have a shelf life of 5 years or greater.

Based upon the foregoing disclosure, it should now be apparent that the present invention is highly effective in providing a temporary coating that possesses advantageous properties over those of previously known compositions. It is, therefore, to be understood that any variations evident fall within the scope of the claimed invention and thus, the selection of specific component elements can be determined without departing from the spirit of the invention herein disclosed and described.

I claim:

1. A coating composition comprising: a base coat component and a top coat component, wherein the base coat component comprises at least one resin selected from the group consisting of a styrene, a styrene-ethylene/butylene-styrene block polymer and a mixture thereof, and at least one solvent for the resin;
and wherein the top coat component comprises a Methyl-methacrylate-Acrylate-Methyl-methacrylate block polymer and a solvent for the Methyl-methacrylate-Acrylate-Methyl-methacrylate block polymer.

2. The coating composition of claim 1, wherein the composition is adapted, when the base coat is applied to a substrate and allowed to dry, and the top coat is applied to the dried base coat and allowed to dry, to provide a dried coating that can be removed from the substrate by physical peeling in a single piece across at least 50 percent of the surface of the substrate.

3. The coating composition of claim 2, wherein the dried coating that can be removed from the substrate by physical peeling in a single piece across at least 80 percent of the surface of the substrate.

4. The coating composition of claim 3, wherein the dried coating that can be removed from the substrate by physical peeling in a single piece across at least 90 percent of the surface of the substrate.

5. The coating composition of claim 4, wherein the dried coating that can be removed from the substrate by physical peeling in a single piece across at least 95 percent of the surface of the substrate.

6. The coating composition of claim 2, wherein the solvent of the top coat component comprises benzyl alcohol.

7. The coating composition of claim 6, wherein the solvent of the top coat component additionally comprises ethyl 3-ethoxyproprionate or dimethyl carbonate or both.

8. The coating composition of claim 7, wherein the top coat component comprises between 10 and 35.1 weight percent Methyl-methacrylate-Acrylate-Methyl-methacrylate block polymer.

9. The coating composition of claim 8, wherein the base coat composition comprises between 5 and 10 weight percent styrene-ethylene/butylene-styrene copolymer and between 1 and 1.5 weight percent styrene.

10. The coating composition of claim 2, wherein the base coat composition comprises between 5 and 10 weight percent styrene-ethylene/butylene-styrene copolymer and between 1 and 1.5 weight percent styrene.

11. A method of coating a substrate with a coating composition that may be removed by physical means only, the method comprising:
providing a base coat component and a top coat component, wherein the base coat component comprises at least one resin selected from the group consisting of a styrene, a styrene-ethylene/butylene-styrene block polymer and a mixture thereof, and at least one solvent for the resin;
and wherein the top coat component comprises a Methyl-methacrylate-Acrylate-Methyl-methacrylate block polymer and a solvent for the Methyl-methacrylate-Acrylate-Methyl-methacrylate block polymer;
and
applying the base coat component to a substrate and allowing the base coat component to dry;
applying the top coat component to the base coat component and allowing the top coat component to dry;
to provide a dried coating that can be removed from the substrate by physical peeling in a single piece across at least 50 percent of the surface of the substrate.

12. The method of claim 11, wherein the dried coating that can be removed from the substrate by physical peeling in a single piece across at least 60 percent of the surface of the substrate.

13. The method of claim 12, wherein the dried coating that can be removed from the substrate by physical peeling in a single piece across at least 70 percent of the surface of the substrate.

14. The method of claim 13, wherein the dried coating that can be removed from the substrate by physical peeling in a single piece across at least 90 percent of the surface of the substrate.

15. The method of claim 14, wherein the dried coating that can be removed from the substrate by physical peeling in a single piece across at least 99 percent of the surface of the substrate.

16. The method of claim 11, wherein the solvent of the top coat component comprises benzyl alcohol.

17. The method of claim 16, wherein the solvent of the top coat component additionally comprises ethyl 3-ethoxyproprionate or dimethyl carbonate or both.

18. The method of claim 17, wherein the top coat component comprises between 10 to 35.1 weight percent Methyl-methacrylate-Acrylate-Methyl-methacrylate block polymer.

19. The method of claim 18, wherein the base coat composition comprises between 5 and 10 weight percent styrene-ethylene/butylene-styrene copolymer and between 1 and 1.5 weight percent styrene.

20. The method of claim 11, wherein the base coat composition comprises between 5 and 10 weight percent styrene-ethylene/butylene-styrene copolymer and between 1 and 1.5 weight percent styrene.

* * * * *